May 27, 1930.  I. L. DUNN  1,760,124
APPARATUS FOR EXTRACTING COMBUSTIBLE VAPORS FROM LIQUID PETROLEUM
Filed Oct. 14, 1926
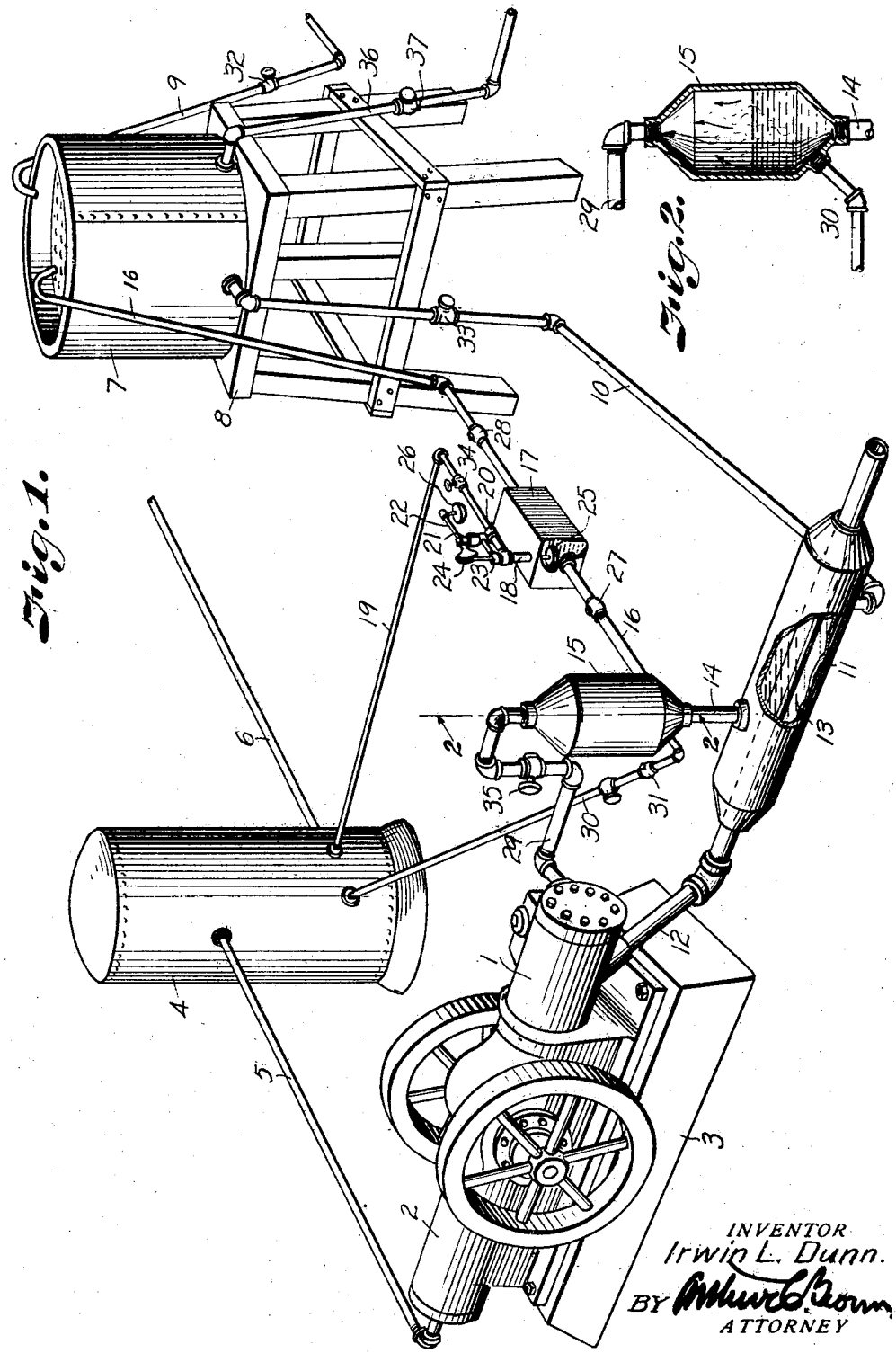
INVENTOR
Irwin L. Dunn.
BY *Arthur E. Brown*
ATTORNEY Patented May 27, 1930

1,760,124

UNITED STATES PATENT OFFICE

IRWIN L. DUNN, OF TULSA, OKLAHOMA

APPARATUS FOR EXTRACTING COMBUSTIBLE VAPORS FROM LIQUID PETROLEUM

Application filed October 14, 1926. Serial No. 141,591.

My invention relates to apparatus for extracting the combustible vapors from liquid petroleum and more particularly to apparatus of that character for use in connection with an explosion engine employed for operating an air-compressor whereby air is supplied for increasing the flow through oil sands to pumping wells; the principal object of the invention being to provide for utilization of crude oil produced in the field served by the compressor as a fuel medium for the engine.

In accomplishing this object, I have provided improved details of structure, the preferred forms of which are illustrated in the accompanying drawings wherein:—

Fig. 1 is a perspective view of apparatus adapted for use in carrying out the purpose of my invention.

Fig. 2 is a central vertical section of the separator forming an element of the apparatus.

Referring more in detail to the drawings:—

1 designates an explosion engine, and 2 an air-compressor operatively connected with the engine, both mounted on a common base 3.

Leading from the compressor to an air storage tank 4 is a conduit 5 and leading from the storage tank is a pipe 6 for conducting air under pressure to a point of use such as the air-well through which air is supplied to oil sands for increasing flow to pumping wells.

Located adjacent the engine is a crude oil storage tank 7, preferably mounted on an elevated platform 8 to provide gravity feed of its contents as presently described, and leading to the tank 7 from a source of crude oil supply is a pipe 9. Leading from the tank 7 is a pipe 10 for conducting crude oil from the tank to an elongated horizontal oil heating receptacle 11 and leading from the engine 1 through the receptacle 11 is an exhaust conduit 12; conduit 12 being of substantially less diameter than the interior of the receptacle 11 to provide an annular chamber 13 within the receptacle through which the crude oil may flow about the exhaust conduit.

Leading from the top of the receptacle 11 is a pipe 14 and mounted on and communicating with the pipe 14 is an oil fractionating or treating tank 15, preferably cylindrical and having conical upper and lower ends. Leading from the side of the tank 15, near the bottom thereof, is a pipe 16 which extends to and is adapted for delivery into the crude oil storage tank 7.

Interposed in the pipe 16 is a float chamber 17 and opening to the top of said chamber is a fitting 18 with which is connected a pipe 19, having communication with the air storage tank 4. The pipe 19 is provided with a valve 20 having a stem 21 connected with a lever 22 pivotally mounted on a bracket 23, carried by the fitting 18, one end of the lever having a wire or rod 24 extended through the fitting and connected with a float 25 within the float chamber, the opposite end of the lever 22 being provided with a weight 26 to counter-balance the float so that the lever will rock under influence of the float to open and close the valve and maintain liquid in the float chamber and in the tank 15 at a determined level.

The pipe 16 is provided with a back-check valve 27 to prevent flow of oil from the float chamber to the tank 15 under influence of the air-pressure when the valve 20 is open and with a back-check valve 28 between the float chamber and crude oil storage tank 7, which will open in the direction of the tank when liquid from the float chamber is forced out under the air-pressure, but will close to prevent back-flow from the storage tank to the float chamber when the float valve is closed and no air under pressure is being admitted to the float chamber.

Leading from the top of the tank 15 and connected with the manifold of the engine 1 is an oil vapor and air conduit 29. Leading from the air storage tank 4 to the bottom of the tank 15 is a pipe 30 through which air from the storage tank is delivered into the tank 15 below the liquid level therein to percolate through the oil in the tank and distill off the light oil vapors of the oil from the heavier components so that the air, when leaving the oil will be mixed with the low boiling vapors and form a fuel mixture for the engine, the heavier components settling into the receptacle 11 and being drawn off from time to time through a drain (not shown).

The pipe 30 is provided with a back-check valve 31 for preventing flow of oil from the tank 15 to the air-storage tank 4, should pressure be depleted in the tank 4.

The pipes and conduits heretofore mentioned may be provided, in addition to the back-check valves, with ordinary control valves such as those designated 32 in the pipe 9; 33 in the pipe 10; 34 in the pipe 19; and 35 in the pipe 29, for controlling flow through the pipes in the ordinary manner.

I also provide the crude oil storage tank with a drain pipe 36 having a control valve 37 and through which the tank may be drained of sediment, or of its entire contents when the apparatus has been in use for a sufficient time for such a quantity of residue from the separator tank 15 to have accumulated in the crude oil storage tank to unduly thin the liquid in storage.

In employing my invention with the apparatus described, the engine may be started on a liquid fuel such as gasoline and continued in operation until its exhaust gases have heated the liquid petroleum in the heating tank 11. When the petroleum in the receptacle 11 has become heated, the valve 33 in the pipe leading to the receptacle from the storage tank 7 is opened and crude oil flowed through the heater into the tank 15. When the flow is started, the valve in the pipe leading from the tank 15 to the engine is opened and air is admitted to the tank 15 from the air-storage tank to percolate through the petroleum in the tank 15 and remove the low boiling vapors of the petroleum liquid and carry it off through the pipe 29 for combustion in the engine.

If the flow of oil to the tank 15 is continuous, over supply of the oil is drawn off from the tank to the float chamber and when the oil has reached a determined level in the float chamber, the valve 20 in the air line 19 is opened and air delivered to the float chamber from the air storage tank, under sufficient pressure to drive the oil in the float chamber through the outlet end of pipe 16 to the oil storage tank 7; in this way maintaining a determined level of oil in the tank 15.

It is apparent therefore, that in accordance with my invention and with the apparatus described, the light oil vapors of the crude oil may be extracted for use in the engine, and that the extraction is continuous and automatic, and that the unvaporized heavy petroleum may be drawn off from time to time to avoid interference with the incoming stock.

What I claim and desire to secure by Letters Patent is:

1. Apparatus for extracting the light vapors from liquid petroleum including an oil fractionating receptacle for petroleum to be treated, means for delivering petroleum to the receptacle, means for heating the petroleum, means for delivering air to said receptacle for percolation through the petroleum, a float chamber connected with the receptacle, an outlet from said chamber, means for delivering air to said chamber, valve mechanism, including a float in said chamber controlling delivery of air to said chamber, to exhaust the chamber through said outlet when the float is raised above the point of constant liquid level, and means connected with the receptacle above the constant liquid level for discharging light petroleum vapors from the receptacle.

2. Apparatus for extracting the light vapors from liquid petroleum including an oil fractionating receptacle for petroleum to be treated, means for delivering petroleum to the receptacle, means for delivering air to said receptacle for percolation through the petroleum, a float chamber having connection with the receptacle, a back check valve in said connection, an outlet from said chamber, means for delivering air to said chamber to serve as a pressure medium, valve mechanism, including a float in said chamber controlling delivery of air to said chamber, to exhaust the chamber through said outlet when the float is raised above the point of constant liquid level, and means connecting with the receptacle above the constant liquid level for discharging light vapors from the receptacle.

3. Apparatus for extracting the light vapors from liquid petroleum including an oil fractionating receptacle for treating the petroleum, means for heating the petroleum, a petroleum supply tank having gravity feed connection with the receptacle, a float chamber having connection with the receptacle for maintaining a constant level of liquid petroleum in the receptacle and having an outlet line leading to the supply tank, back check valves in said last mentioned connection and in said outlet line, an air line opening to the float chamber, means responsive to the level of liquid in the float chamber for automatically controlling flow through the air line and delivery of liquid petroleum from the chamber to the supply tank, means for delivering air for percolation through the petroleum in the receptacle, and an air outlet leading from the tank above the liquid therein.

In testimony whereof I affix my signature.

IRWIN L. DUNN.